United States Patent [19]

Jee

[11] Patent Number: 5,114,205
[45] Date of Patent: May 19, 1992

[54] VEHICULAR AIR DEFLECTOR

[76] Inventor: Elwood Y. Jee, 1800 Wynnewood La., Cincinnati, Ohio 45237

[21] Appl. No.: 729,174

[22] Filed: Jul. 12, 1991

[51] Int. Cl.⁵ ............................................. B60H 1/24
[52] U.S. Cl. ..................................... 296/152; 454/131
[58] Field of Search ............... 296/152, 91, 180.1; 98/2.12, 2.13

[56] References Cited

U.S. PATENT DOCUMENTS

| | | | |
|---|---|---|---|
| 2,468,439 | 4/1949 | Gregorius | 98/2.13 |
| 2,557,442 | 6/1951 | Kurilo | 98/2.13 |
| 2,655,404 | 10/1953 | Cash | 296/152 |
| 2,657,089 | 10/1953 | Kaul | 296/152 |
| 2,685,470 | 8/1954 | Werner | 296/152 X |
| 2,878,055 | 3/1959 | Werner et al. | 296/152 |
| 3,659,516 | 5/1972 | MacDonald | 98/2.12 |
| 4,546,693 | 10/1985 | McTaw, Jr. | 296/152 X |
| 4,746,162 | 5/1988 | Maness | 296/152 |

FOREIGN PATENT DOCUMENTS

| | | | |
|---|---|---|---|
| 1573395 | 7/1969 | France | 296/152 |
| 223519 | 12/1984 | Japan | 296/152 |
| 247214 | 10/1989 | Japan | 296/152 |
| 159335 | 2/1979 | Netherlands | 296/152 |

Primary Examiner—Margaret A. Focarino
Assistant Examiner—Joseph D. Pape
Attorney, Agent, or Firm—Leon Gilden

[57] ABSTRACT

An air deflector is mounted in a vehicle and fixedly secured to the window channel and outer edge of the vehicular door, with a deflector plate mounted to a support boss. The support boss adjustably mounts a plurality of "J" shaped mounting plates to the boss to clamp the door frame. A modification of the invention includes plural columns of air openings through the plate directed at decreasing angles of orientation relative to the plate to direct air interiorly of the passenger compartment in limited quantities. Further, a support boss of the deflector plate is optionally provided with a through-extending conduit and feed conduit to direct a fluid fragrance through the deflector plate.

3 Claims, 4 Drawing Sheets

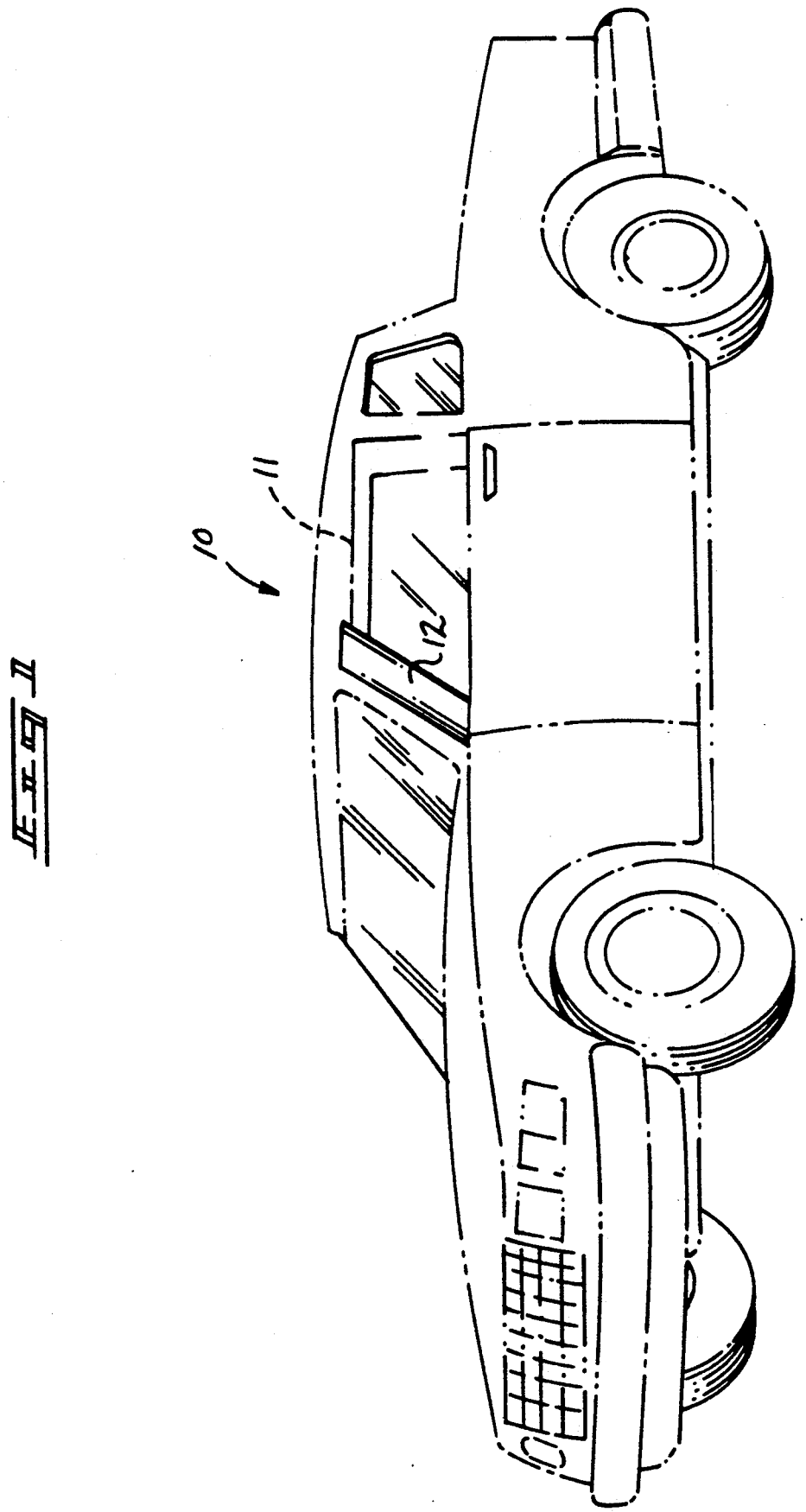

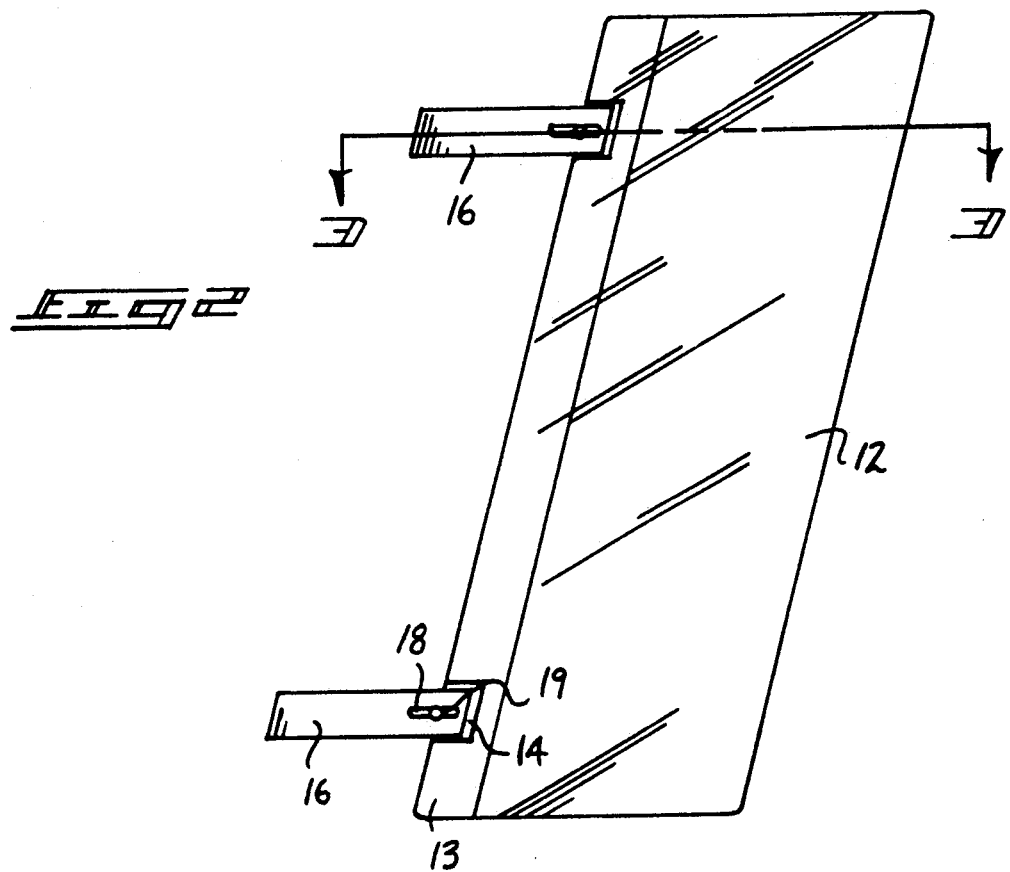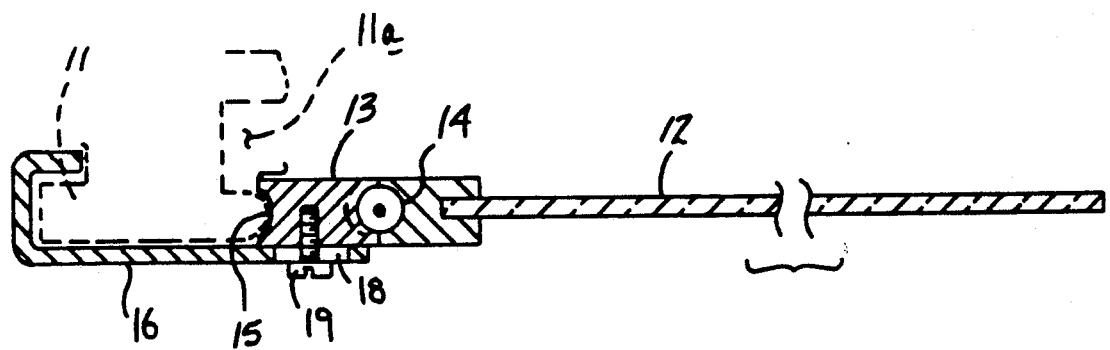

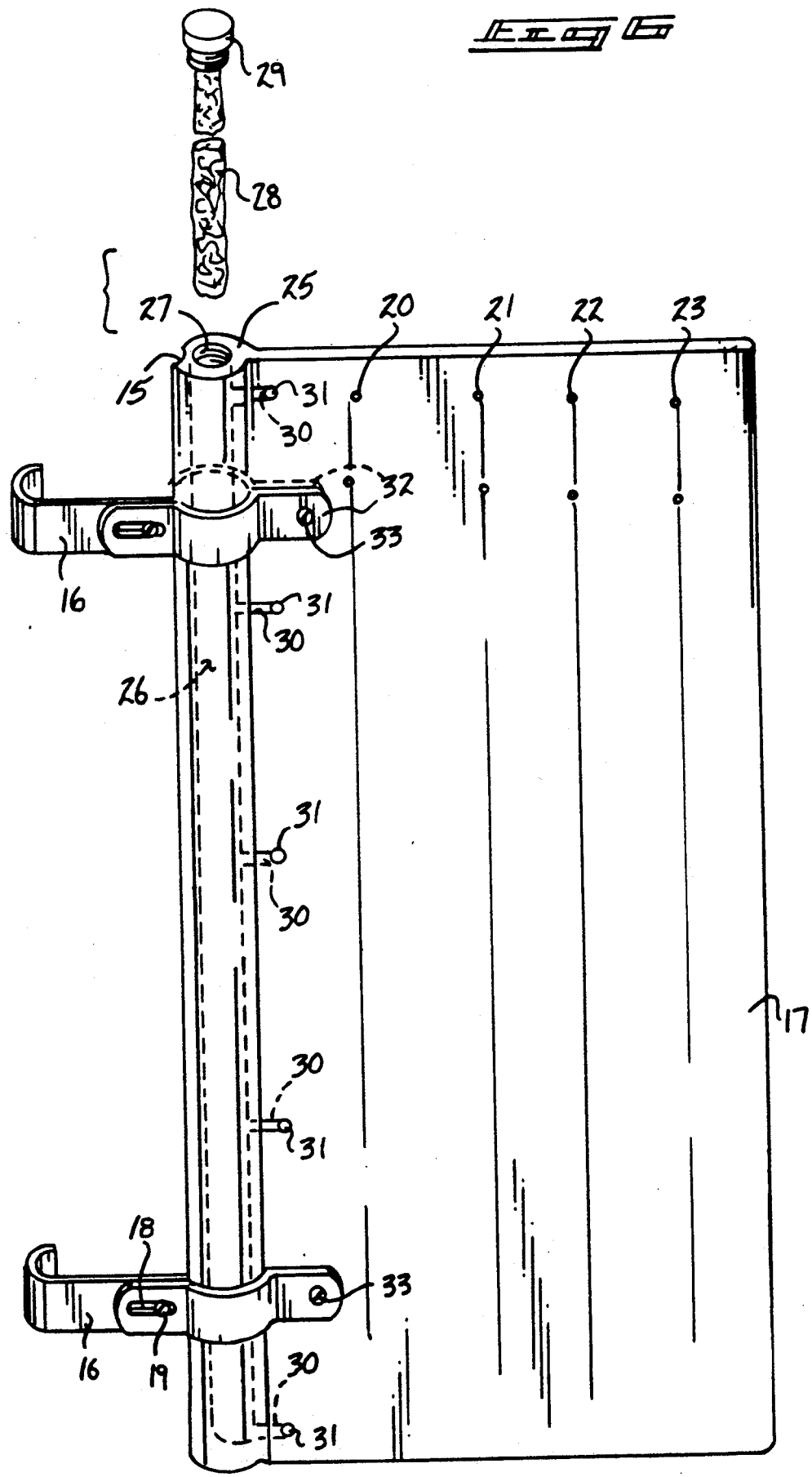

VEHICULAR AIR DEFLECTOR

BACKGROUND OF THE INVENTION

1. Field of the Invention

The field of invention relates to air deflector apparatus, and more particularly pertains to a new and improved vehicular air deflector arranged for mounting to a vehicular door member.

2. Description of the Prior Art

Vehicles such as trucks and automobiles utilized typically do not have constructed therewith vent windows. Such vent windows in the past have been of triangular configuration for pivotment relative to a portion of the window of the door associated with the vehicle to direct a flow of air into a passenger compartment relative to the vehicle. Prior art structure to mount such air deflector apparatus to a vehicle is exemplified in U.S. Pat. No. 4,347,781 to Hassell mounting an air deflector to a reciprocatably mounted window member of a door.

U.S. Pat. No. 4,685,715 to Hardin sets forth an air baffle mounted to a vehicle mounted to a side of the vehicle to provide air deflection relative to the vehicle, such as in a truck assembly.

U.S. Pat. No. 4,577,929 to Guillen sets forth a side mounted mirror mounted relative to a door frame.

U.S. Pat. No. 4,776,627 to Hutto, et al. sets forth a wind deflector and screen member for covering the grill and the like of an associated vehicle.

As such, it may be appreciated that there continues to be a need for a new and improved vehicular air deflector as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of air deflector apparatus now present in the prior art, the present invention provides a vehicular air deflector wherein the same is arranged for mounting to a door frame of a vehicle and further provide operative structure to direct limited air flow therethrough. As such, the general purpose of the present invention, which will be described subsequently in greater detail, is to provide a new and improved vehicular air deflector which has all the advantages of the prior art vehicular air deflector apparatus and none of the disadvantages.

To attain this, the present invention provides an air deflector mounted in a vehicle and fixedly secured to the window channel and outer edge of the vehicular door, with a deflector plate mounted to a support boss. The support boss adjustably mounts a plurality of "J" shaped mounting plates to the boss to clamp the door frame. A modification of the invention includes plural columns of air openings through the plate directed at decreasing angles of orientation relative to the plate to direct air interiorly of the passenger compartment in limited quantities. Further, a support boss of the deflector plate is optionally provided with a through-extending conduit and feed conduit to direct a fluid fragrance through the deflector plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular air deflector which has all the advantages of the prior art vehicular air deflector apparatus and none of the disadvantages.

It is another object of the present invention to provide a new and improved vehicular air deflector which may be easily and efficiently manufactured and marketed.

It is a further object of the present invention to provide a new and improved vehicular air deflector which is of a durable and reliable construction.

An even further object of the present invention is to provide a new and improved vehicular air deflector which is susceptible of a low cost of manufacture with regard to both materials and labor, and which accordingly is then susceptible of low prices of sale to the consuming public, thereby making such vehicular air deflectors economically available to the buying public.

Still yet another object of the present invention is to provide a new and improved vehicular air deflector which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the organization mounted to an associated automobile.

FIG. 2 is an orthographic side view of the invention.

FIG. 3 is an orthographic view, taken along the lines 3—3 of FIG. 2 in the direction indicated by the arrows.

FIG. 6 is a further modified configuration of the instant invention.

DESCRIPTION OF THE PREFERRED EMBODIMENT

Figure 4:
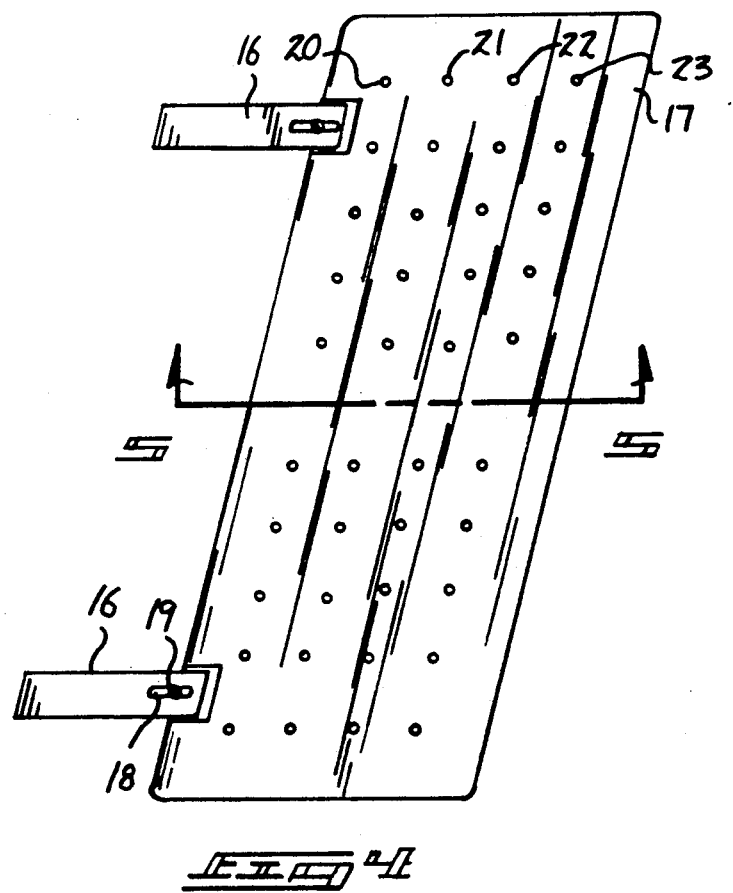
FIG. 4 is an orthographic side view of a modified construction of the invention.

With reference now to the drawings, and in particular to FIGS. 1 to 6 thereof, a new and improved vehicular air deflector embodying the principles and concepts of the present invention and generally designated by the reference numeral 10 will be described.

More specifically, the vehicular air deflector 10 of the instant invention essentially comprises securement to a door frame 11 of an associated automotive vehicle, as illustrated in FIG. 1, wherein the door frame 11 includes a window channel 11a (see FIG. 3) for accommodating the deflector 10 for securement between a forward edge of the door frame 11 and the window channel 11a. A deflector plate 12 is mounted to a support boss 13. The support boss 13 includes a plurality of hinge axles 14 pivotally mounting a "J" shaped mounting plate 16, wherein the "J" shaped mounting plate includes a forward leg for mounting about a forward edge of the door frame, as illustrated in FIG. 3. The support boss 13 includes a concave recess 15 for receiving a rear edge of the door frame spaced from the forward edge, as illustrated. Accordingly, the concave recess 15 is in confrontation to the leg of the "J" shaped mounting plate 16. A slot 18 longitudinally directed medially of each mounting plate 16 adjacent the boss 13 includes a locking fastener 19 directed through the slot 18 into the boss 13 to permit positioning of the mounting plate 16 relative to the boss 13 to provide clamping of the door frame therebetween.

Figure 5:
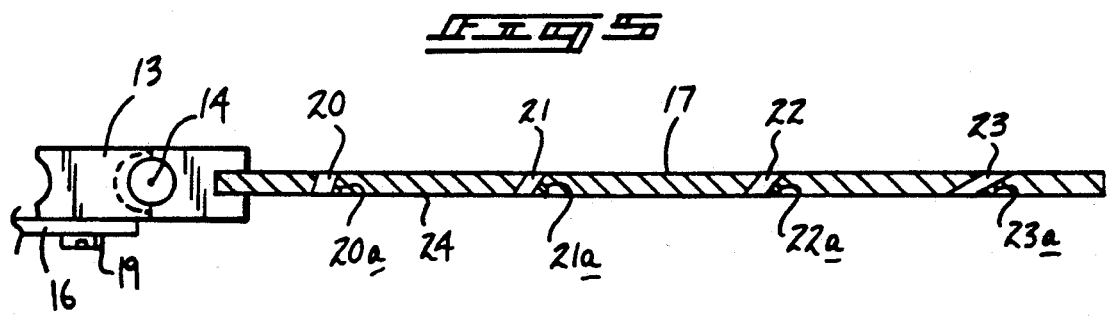
FIG. 5 is an orthographic view, taken along the lines 5—5 of FIG. 4 in the direction indicated by the arrows.

FIGS. 4 and 5 illustrate a modified deflector plate 17, including a plurality of columns of through-extending apertures defined by respective first, second, third, and fourth columns of through-extending apertures 20, 21, 22, and 23 respectively. Each of the apertures is inclined at an acute angle relative to the deflector plate exterior face 24 positioned in an outwardly facing relationship relative to the door frame and associated door of the vehicle, wherein a respective first, second, third, and fourth acute angle 20a, 21a, 22a, and 23a respectively are associated with the first through fourth apertures 20-24. The fourth angle 23a is less than the third angle 22a, which in turn is less than the second angle 21a, which in turn is less than the first angle 20a. The ever decreasing angle between the exterior face 24 and each respective aperture of the columns of apertures permits directing of modified air currents through the deflector plate depending upon angular rotation of the deflector plate relative to the mounting plates 16.

FIG. 6 illustrates a further modified deflector organization, wherein the support boss is of a modified construction and defines a modified boss 25, including a conduit 26 directed therethrough. The boss conduit 26 includes an internally threaded upper end 27 to complementarily receive an externally threaded plug 29 that mounts a fluid wick 28. The fluid wick 28 is impregnated with a fluid fragrance. The fluid fragrance is directed through the conduit 26 and subsequently through feed conduits 30, wherein the feed conduits 30 direct the fluid fragrance from the conduit 26 through the feed conduits 30 and into apertures 31 that are through-extending the deflector plate 17. This permits a predetermined quantity of fragrance to be directed as desired into the passenger compartment of the vehicle during traverse of the vehicle.

Spaced support clamps 32 mount the modified support boss 25 therebetween. A clamp fastener 33 clamps the boss 25 between the boss clamps, wherein an outer boss clamp includes the elongate slot 18 and fastener 19 to permit selective adjustment of the plate fastener 16 relative to the outer boss clamp. As noted, the modified support boss 25 includes elongate concave recess 15 to accommodate the interior edge of the door frame, as described above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular air deflector, comprising,
   a deflector plate, the deflector plate mounted coextensively to a support boss, the support boss including an elongate concave recess coextensive with the support boss, and
   the support boss including a plurality of "J" shaped mounting plates mounted to the support boss, each "J" shaped mounting plate including a leg member, each leg member positioned forwardly relative to the concave recess to secure a door frame between each leg member and the concave recess, and
   wherein each mounting plate includes an elongate slot positioned adjacent the support boss, and the support boss defined by an elongate cylindrical configuration, and a plurality of pairs of support boss clamps, each pair of support boss clamps mounting one of said mounting plates thereto, and at least one of said support boss clamps including an elongate boss slot aligned with the slot of each mounting plate to longitudinally secure each mounting plate relative to each pair of support boss clamps.

2. A deflector as set forth in claim 1 wherein the support boss includes a conduit directed through the support boss, and the conduit includes a plurality of feed conduits in communication with the conduit, and each of the feed conduits terminates in an aperture, each of the apertures is directed through the deflector plate, and the conduit including an internally threaded upper terminal end, and an externally threaded plug receivable within the internally threaded upper terminal end, and the plug including a wick member mounted thereto, the wick member including a fluid fragrance within the wick member to direct the fragrance through the conduit, the feed conduits and each of the apertures.

3. A deflector as set forth in claim 2 wherein the deflector plate includes a plurality of columns of through-extending apertures, and the columns of through-extending apertures includes at least a first, second, and third column of apertures, the first column of apertures defining a first acute angle between the first column of apertures and an exterior surface of the deflector plate, the second column of apertures defining a second acute angle between the second column of apertures and the exterior surface of the deflector plate, and the third column of apertures defining a third acute angle between the third column of apertures and the exterior surface of the deflector plate, wherein the third acute angle is less than the second acute angle, the second acute angle is less than the first acute angle.

* * * * *